US008160904B1

(12) United States Patent
Smith

(10) Patent No.: US 8,160,904 B1
(45) Date of Patent: Apr. 17, 2012

(54) SYSTEM AND METHOD TO PROVIDE PROCESS STATUS UPDATE INFORMATION

(75) Inventor: Arthur Q. Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 735 days.

(21) Appl. No.: 11/733,799

(22) Filed: Apr. 11, 2007

(51) Int. Cl.
*G06Q 40/00* (2012.01)
(52) U.S. Cl. .......................................................... 705/4
(58) Field of Classification Search ................... 705/1–4
See application file for complete search history.

(56) References Cited

U.S. PATENT DOCUMENTS

| | | | | |
|---|---|---|---|---|
| 5,950,169 | A * | 9/1999 | Borghesi et al. ................... | 705/4 |
| 6,388,579 | B1 | 5/2002 | Adcox et al. | |
| 6,658,586 | B1 | 12/2003 | Levi | |
| 6,766,307 | B1 * | 7/2004 | Israel et al. ....................... | 705/80 |
| 6,845,448 | B1 | 1/2005 | Chaganti | |
| 7,069,227 | B1 | 6/2006 | Lintel, III et al. | |
| 7,272,610 | B2 * | 9/2007 | Torres ............................ | 707/101 |
| 7,933,786 | B2 * | 4/2011 | Wargin et al. ...................... | 705/4 |
| 7,953,615 | B2 * | 5/2011 | Aquila et al. ...................... | 705/4 |
| 2001/0025275 | A1 * | 9/2001 | Tanaka et al. .................. | 705/412 |
| 2003/0144887 | A1 * | 7/2003 | Debber ............................. | 705/4 |
| 2004/0172310 | A1 * | 9/2004 | Atlee et al. ........................ | 705/4 |
| 2007/0226018 | A1 * | 9/2007 | Gross et al. ....................... | 705/4 |

OTHER PUBLICATIONS

Gale, Sarah Fister. "Save money: Manage health benefits online." Workforce Nov. 1, 2001; pp. 64-68 (4 pages).*
Hoehne, Richard. "Portals enable E-business on demand." National Underwriter Mar. 31, 2003 (1 page).*
Jackson, Donald R. "Insurance on the Internet." LIMRA's MarketFacts Quarterly Apr. 1, 2003 (7 pages).*
Silvestri, Fred. "Opening the Door to a Claims Portal." Canadian Underwriter Feb. 1, 2006 (2 pages).*
iVoice Deploying IVR System for Summit Insurance. Business Wire Feb. 10, 2004, p. 1, (3 pages).*
Rosso, Anne. "Automating the Call." Collector Oct. 1, 2006 (5 pages).*

* cited by examiner

*Primary Examiner* — Elda Milef
(74) *Attorney, Agent, or Firm* — Schwegman, Lundberg & Woessner, P.A.

(57) ABSTRACT

Disclosed are systems and methods to provide process status update information. The systems and methods provide techniques to communicate with a party about a process in which the party has an interest, provide the party with an identifier, the identifier related to the party and the process, and provide a process status updater operable to provide information about the process to the party, wherein the information about the process is provided when the party accesses the process status updater using the identifier.

21 Claims, 15 Drawing Sheets

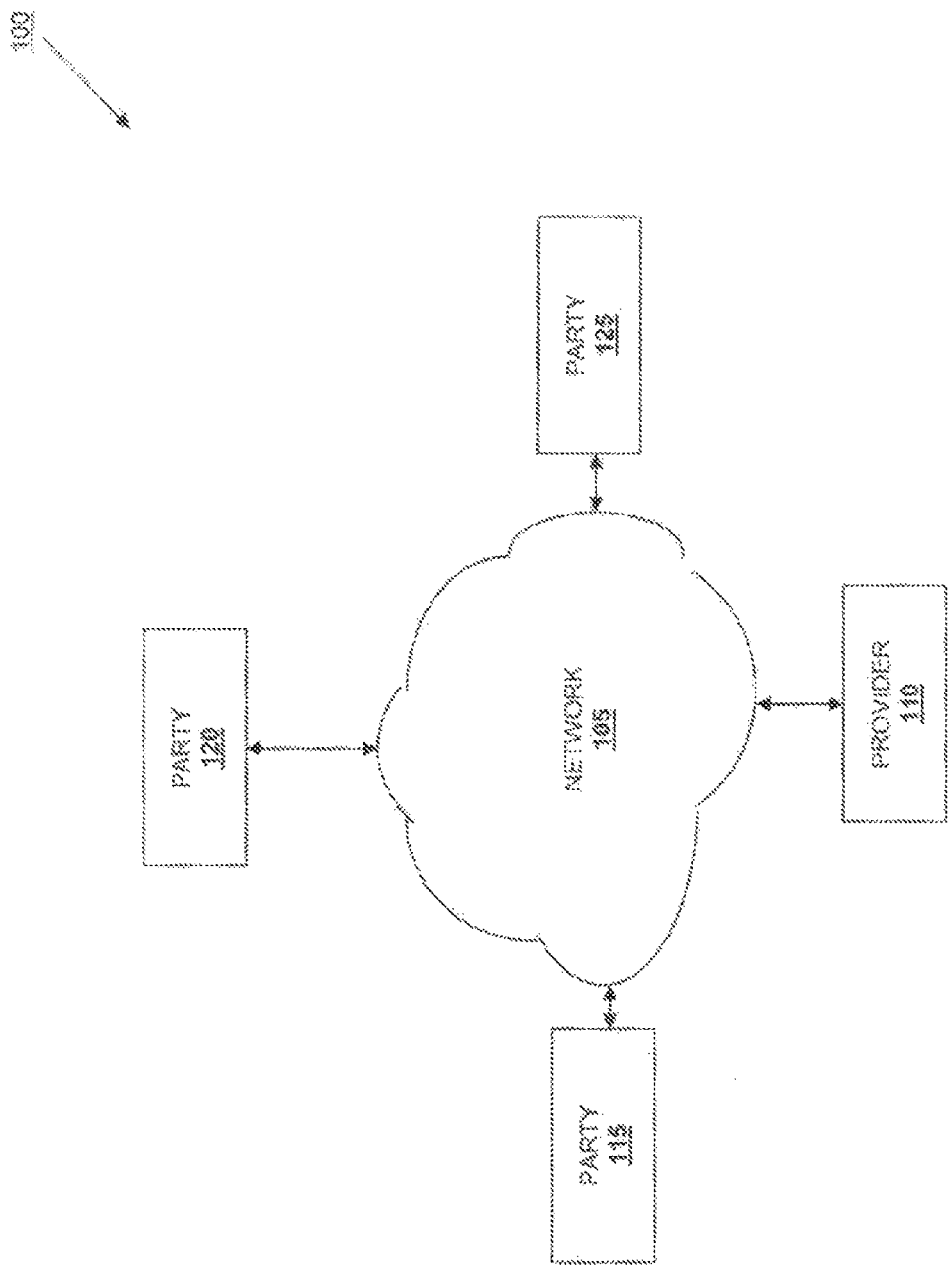

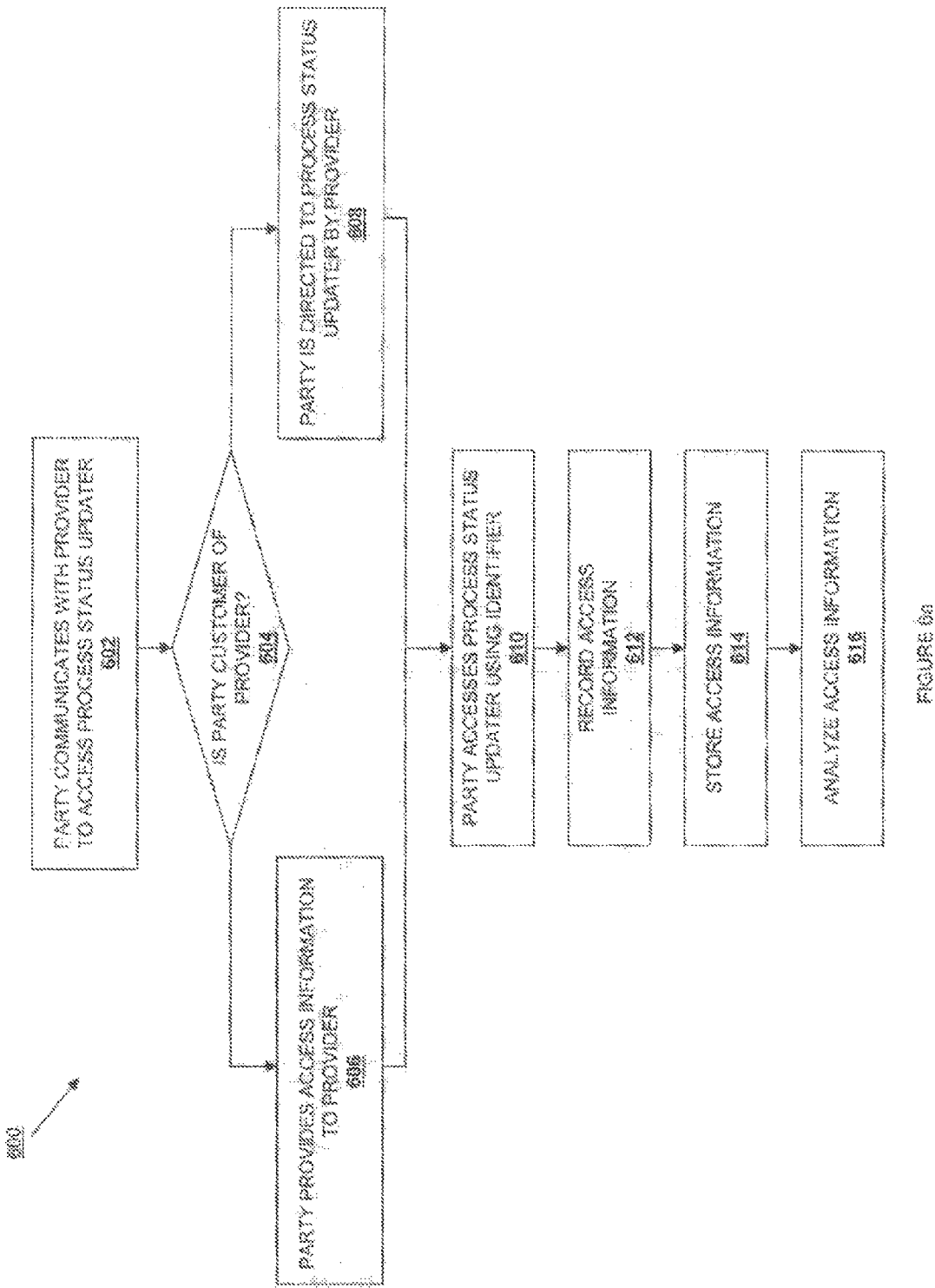

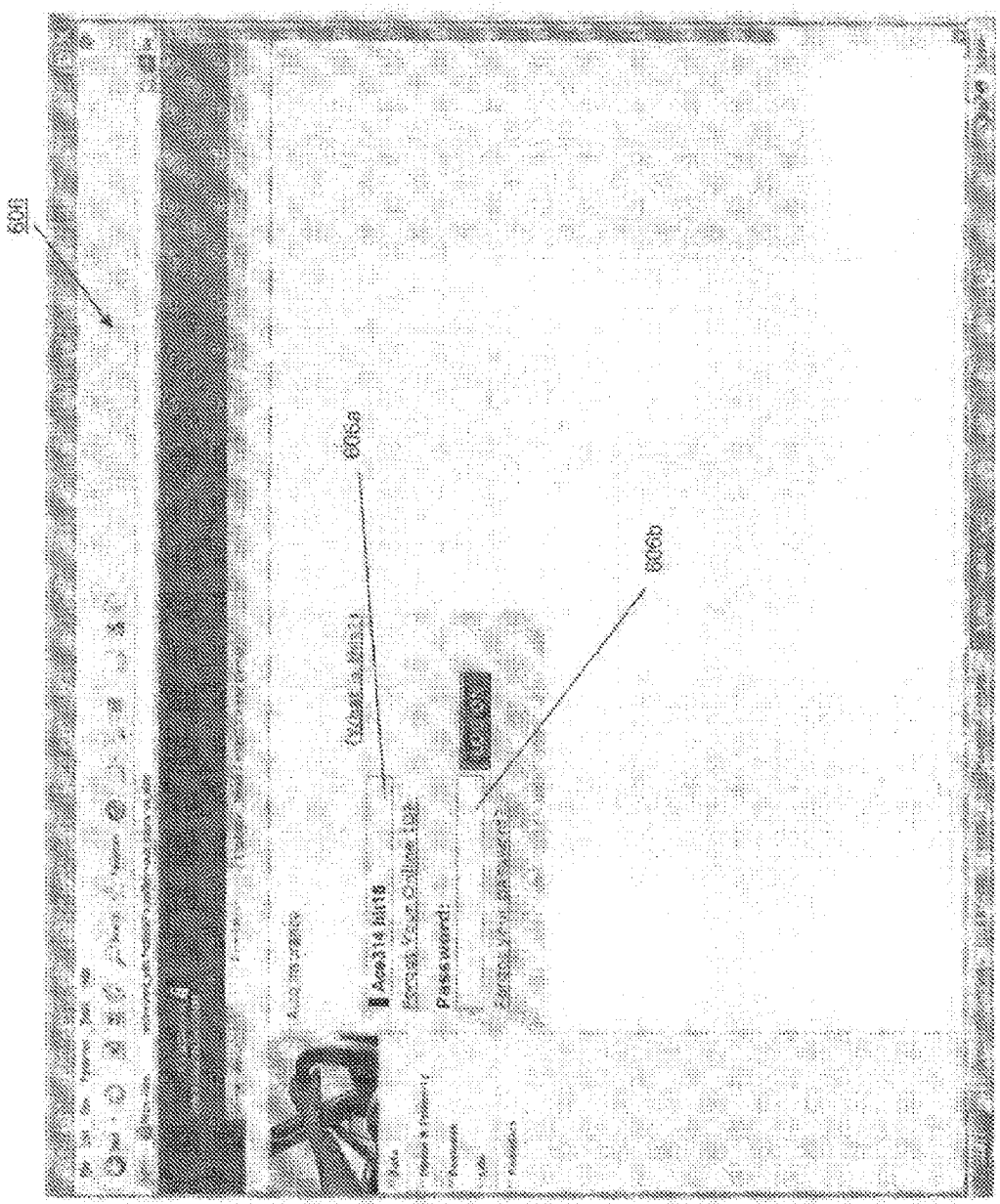

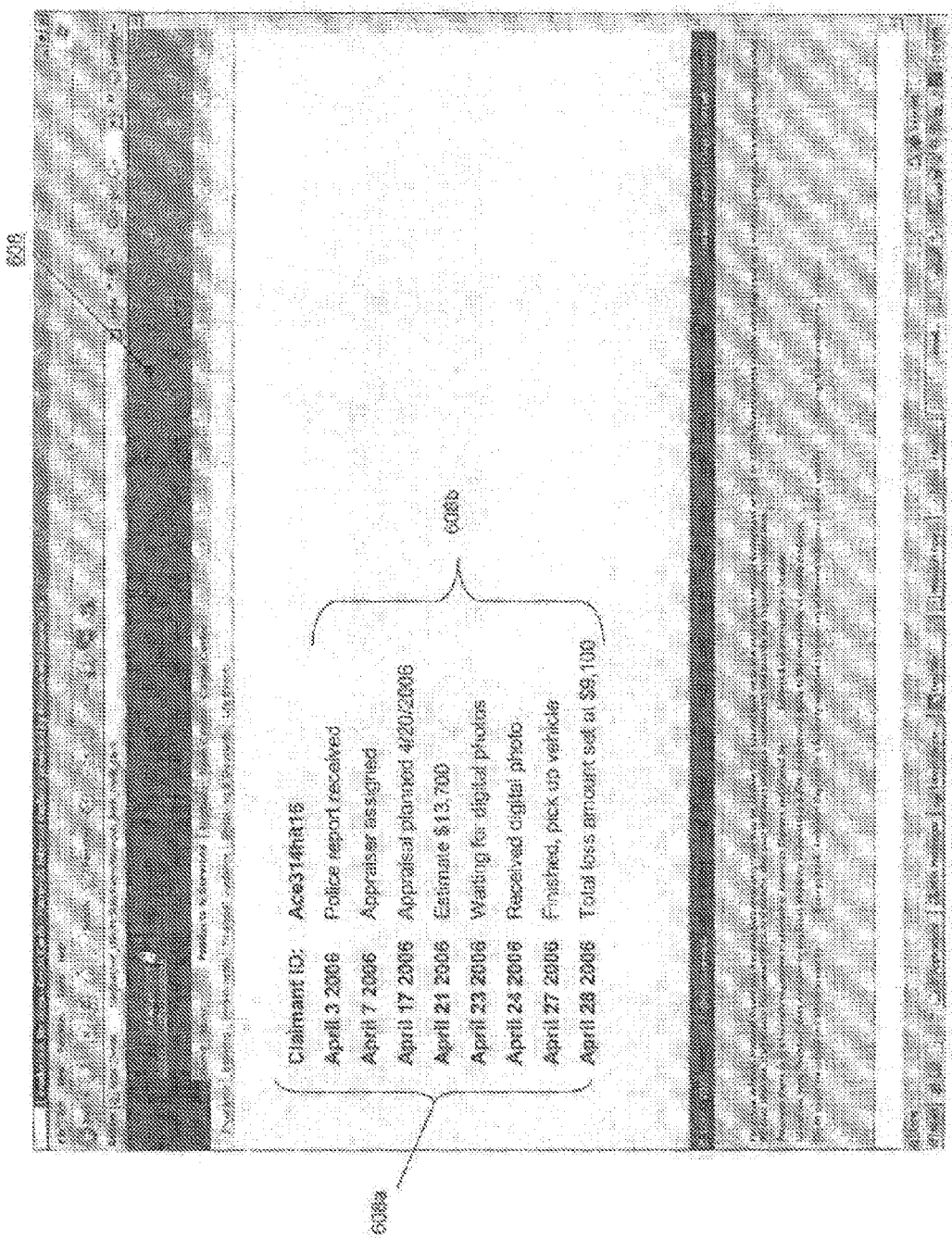

SYSTEM AND METHOD TO PROVIDE PROCESS STATUS UPDATE INFORMATION

FIELD OF THE DISCLOSURE

Various embodiments of the disclosure pertain to a system and method to provide process status update information and, more particularly, to a system and method to communicate with a party about a process in which the party has an interest, provide the party with an identifier, the identifier related to the party and the process, and provide a process status updater operable to provide information about the process to the party, wherein the information about the process is provided when the party accesses the process status updater using the identifier.

BACKGROUND

Providing process status update information is well-known and readily appreciated by those of skill in the art. In the area of insurance claims, a party may report an insurance claim to a provider. Typically, the reporting of such a claim begins an insurance claim process. The insurance claim process includes a number of steps that occur before the insurance claim process is completed such as, for example, a damage appraisal for insured property, an adjustment of the damage appraisal to determine, for example, pre-existing conditions that may change the amount the provider will pay to the party, different stages of repair of damaged property, and/or a variety of other insurance claim process steps. During the insurance claim process, the party may want and sometimes may need information on the status of their insurance claim. The providing of such information on the insurance claim process raises a number of issues.

Conventionally, the party will either wait to be contacted by the provider by phone or the party will contact the provider by phone. Because of the many steps that occur before the insurance claim process is completed, a single party may require many calls to be repeatedly updated with information on the status of their insurance claim process. Also, an insurance claim may include several parties that need the information such that the number of calls about a given insurance claim process is multiplied further. These calls must be handled by claims adjusters, which is very time intensive and expensive for the provider. In addition, each call requires the claims adjuster to get several pieces of identifying information such as, for example, a name, a claim number, and/or a verification password, in order to access the claim and ensure that the caller is a party associated with the insurance claim. This creates further inefficiencies and provides an unsatisfactory experience for a party that has already called several times for information updates on their insurance claim process.

Accordingly, it would be desirable to provide an improved system and method to provide process status update information.

SUMMARY

Various embodiments of the present disclosure are directed to systems and methods to provide process status update information. For example, in some embodiments, the system and method communicate with a party about a process in which the party has an interest. The system and method may then provide the party with an identifier, the identifier related to the party and the process, and provide a process status updater operable to provide information about the process to the party, wherein the information about the process is provided when the party accesses the process status updater using the identifier.

BRIEF DESCRIPTION OF THE DRAWINGS

FIG. 1b is a schematic view illustrating an embodiment of an information handling system used with the system to provide process status update information of FIG. 1a.

FIG. 1c is a schematic view illustrating an embodiment of a provider used in the system to provide process status update information of FIG. 1a.

FIG. 1d is a flow chart illustrating an embodiment of a method to provide process status update information.

FIG. 6a is a flow chart illustrating an embodiment of a method to provide process status update information.

FIG. 6b is a screenshot illustrating an embodiment of a provider login website used in the method to provide process status update information of FIGS. 1d, 2, 3, 4, 5 and 6a.

FIG. 6c is a screenshot illustrating an embodiment of a process status updater multiple party status listing website used in the method to provide process status update information of FIGS. 1d, 2, 3, 4, 5 and 6a.

FIG. 6d is a screenshot illustrating an embodiment of a process status updater login website used in the method to provide process status update information of FIGS. 1d, 2, 3, 4, 5 and 6a.

FIG. 6e is a screenshot illustrating an embodiment of a process status updater single party listing website used in the method to provide process status update information of FIGS. 1d, 2, 3, 4, 5 and 6a.

FIG. 6f is a screenshot illustrating an embodiment of a process status updater bid indicator website used in the method to provide process status update information of FIGS. 1d, 2, 3, 4, 5 and 6a.

FIG. 6g is a screenshot illustrating an embodiment of a process status updater bid listing website used in the method to provide process status update information of FIGS. 1d, 2, 3, 4, 5 and 6a.

DETAILED DESCRIPTION

Figure 1B:
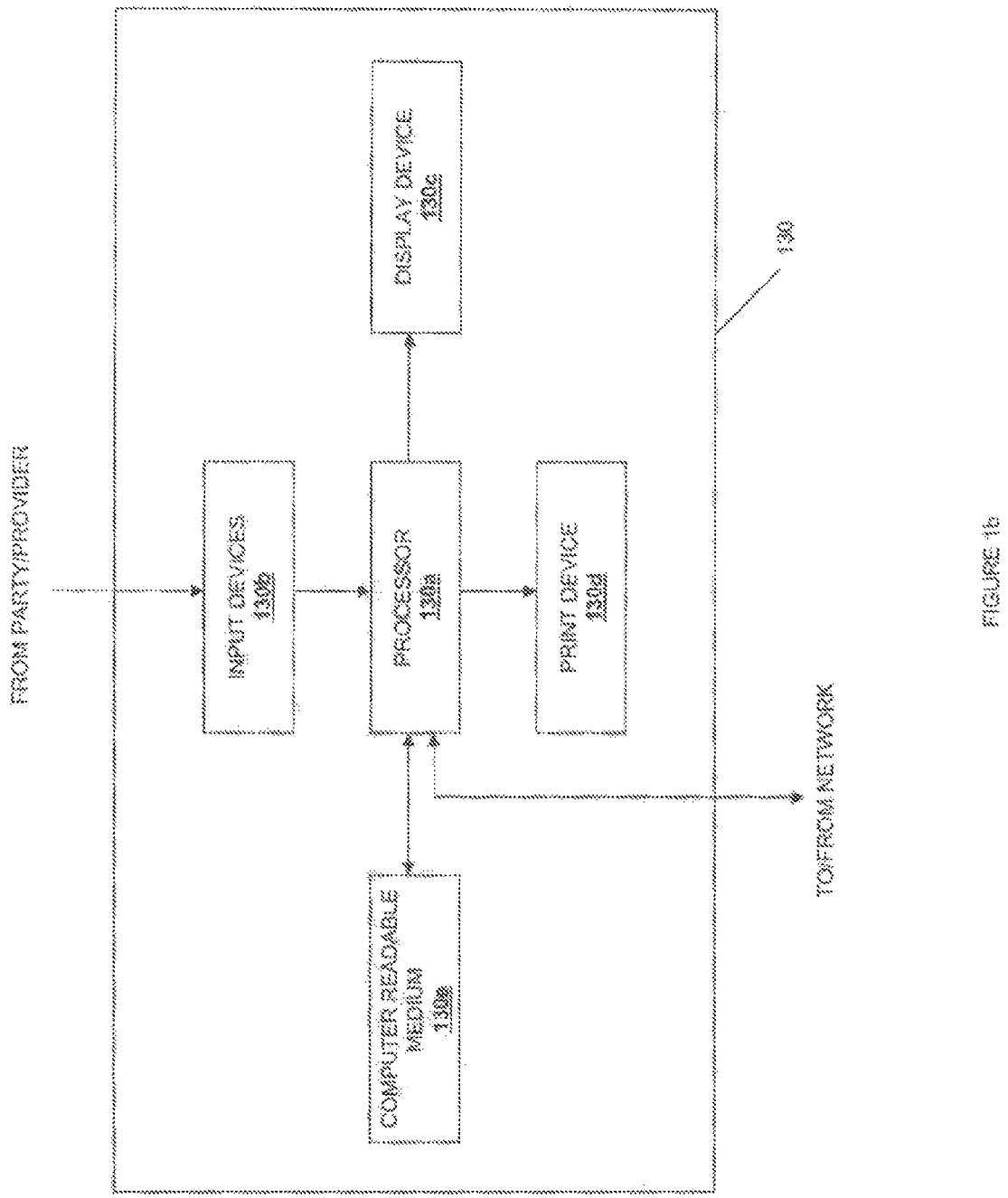
Figure 1C:
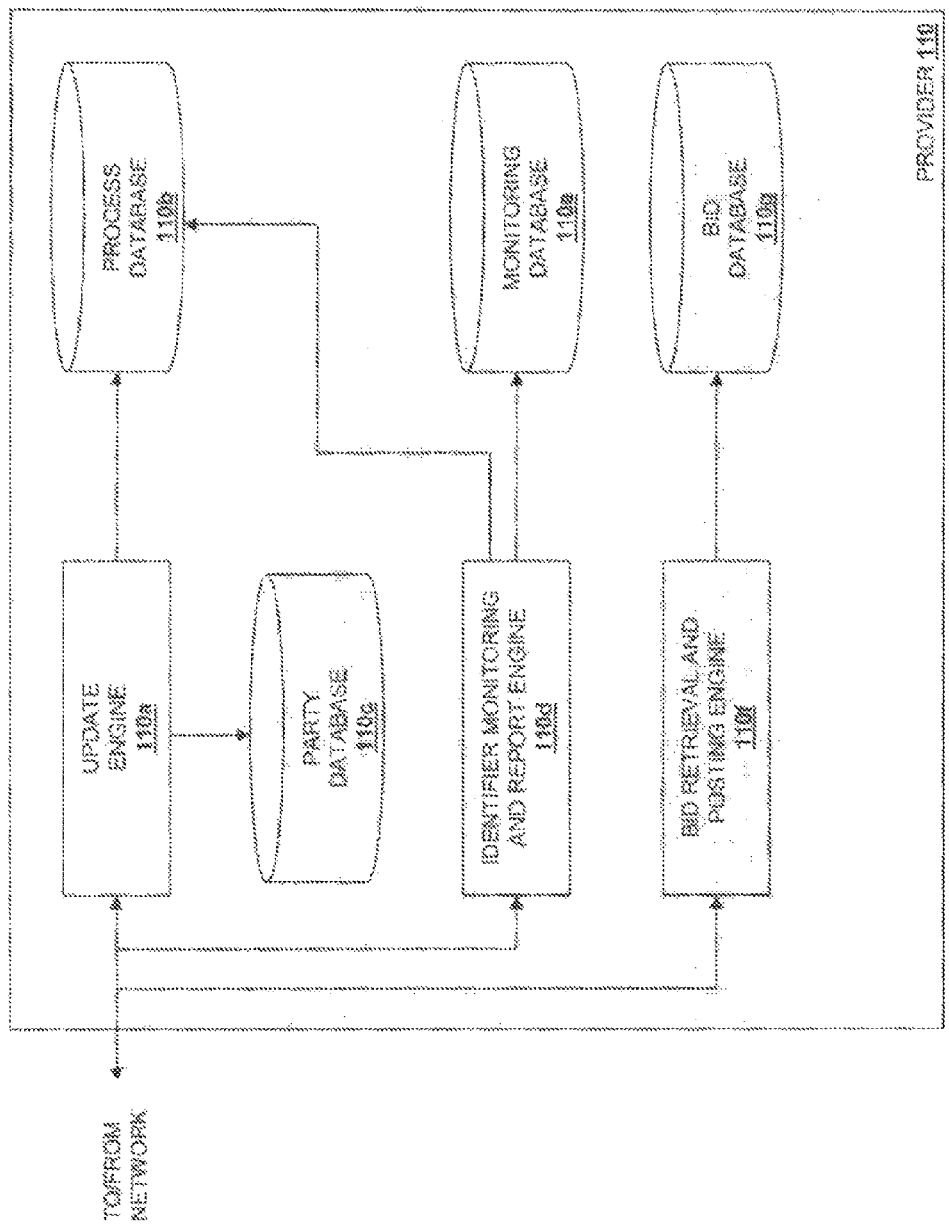
Figure 1A:
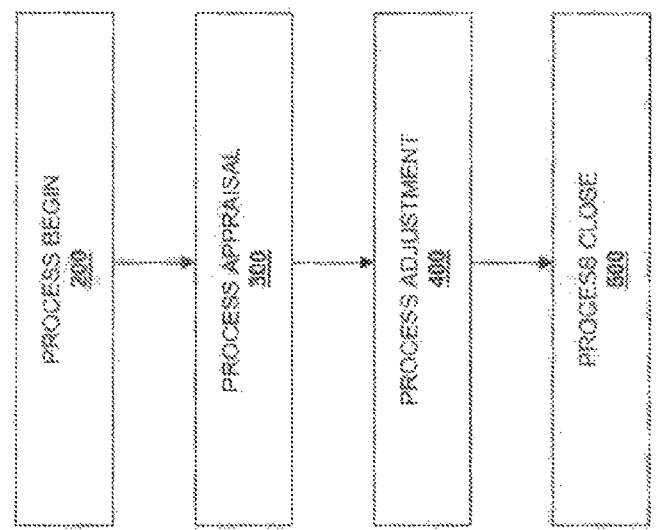
FIG. 1a is a schematic view illustrating an embodiment of a system to provide process status update information.
Figure 1A:
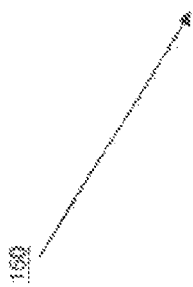
Figure 2:
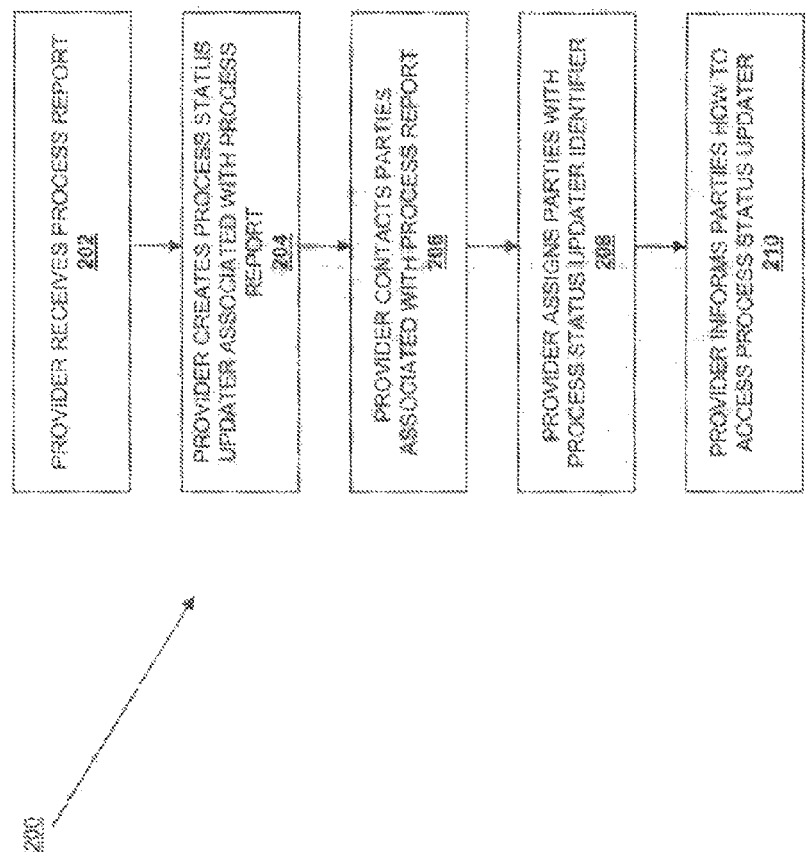
FIG. 2 is a flow chart illustrating an embodiment of a method to provide process status update information.
Figure 3:
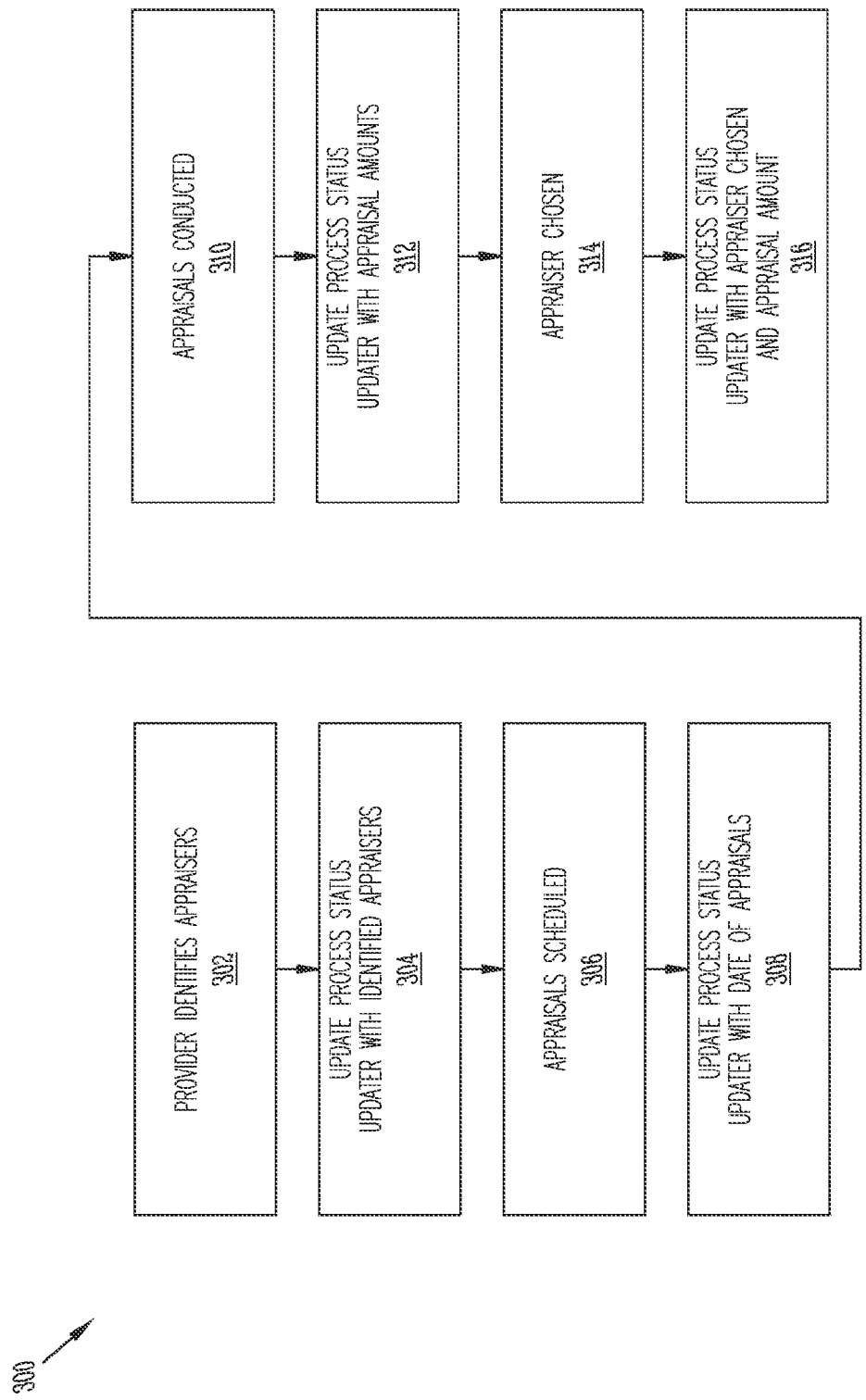
FIG. 3 is a flow chart illustrating an embodiment of a method to provide process status update information.
Figure 4:
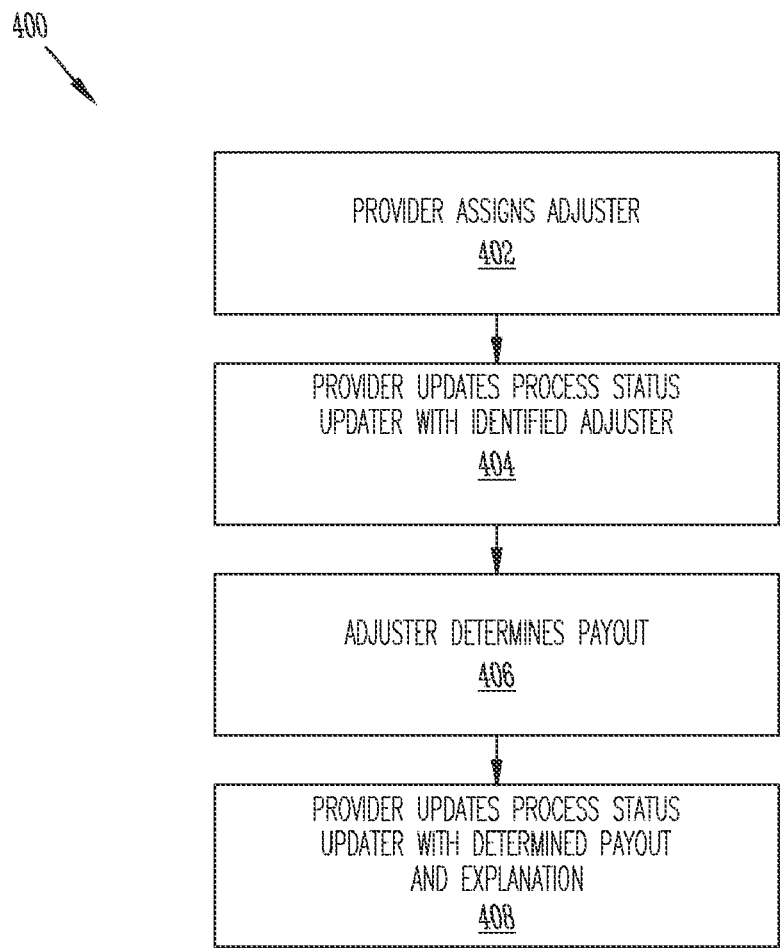
FIG. 4 is a flow chart illustrating an embodiment of a method to provide process status update information.
Figure 5:
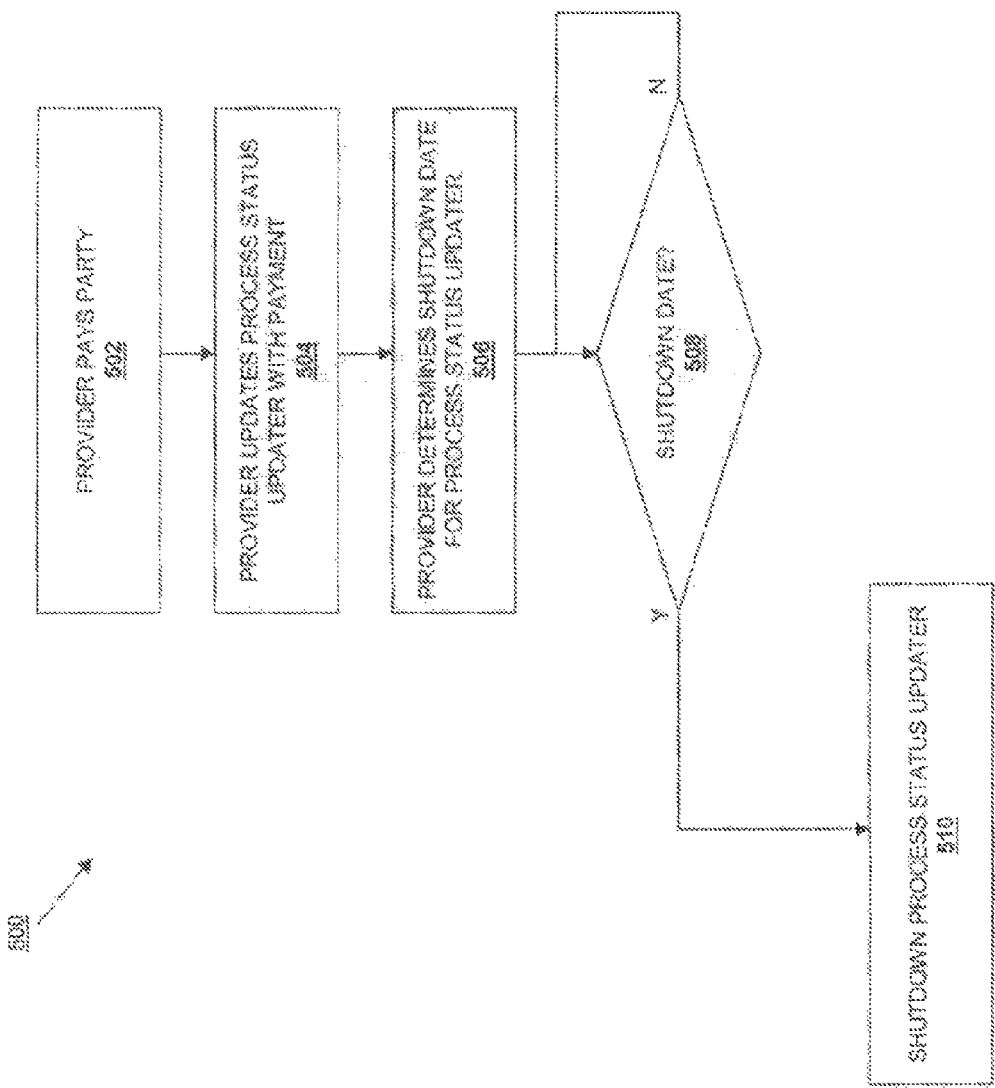
FIG. 5 is a flow chart illustrating an embodiment of a method to provide process status update information.

Referring now to FIG. 1a, in one embodiment, a system to provide process status update information 100 is illustrated. The system 100 includes a computer network 105 such as, for example, a Transport Control Protocol/Internet Protocol (TCP/IP) network (e.g., the internet or an intranet). A provider 110 is operably coupled to the network 105. A plurality of parties 115, 120 and 125 are also operably coupled to the network 105 in order to allow communication between the parties 115, 120 and 125 and the provider 110. In an embodiment, the provider 110 includes a membership organization which provides a plurality of services for its members such as, for example, banking, insurance, financial services, loan providing, and/or a variety of other services, wherein the members may include party 115, 120 and/or 125. In an embodiment, the provider 110 may provide car insurance, homeowners insurance, personal property insurance, and/or life insurance. In an embodiment, the provider 110 may be a third party to a party and a insurance provider where the insurance provider provides insurance to the party. In an embodiment, the parties 115, 120 and 125 may be, for example, a person making an insurance claim to their insurance provider, a person making an insurance claim to another persons provider, or a representative of person making an insurance claim to an insurance provider. In an embodiment, the provider 110 may provide home loans. In an embodiment, the provider 110 may be a third party to a party and a loan provider where the loan provider provides a loan to the party. In an embodiment, the parties 115, 120 and 125 may be, for example, a person seeking a loan from the loan provider or a representative of person seeking a loan from the loan provider. In an embodiment, the provider 110 may provide medical services. In an embodiment, the provider 110 may be a third party to a party and a medical services provider where the medical services provider provides medical services to the party. In an embodiment, the parties 115, 120 and 125 may be, for example, a person seeking medical services from the medical services provider or a representative of person seeking medical services from the medical services provider. In an embodiment, the provider 110 may provide home buying and/or selling services. In an embodiment, the provider 110 may be a third party to a party and a home buying and/or selling services provider where the home buying and/or selling services provider provides home buying and/or selling services to the party. In an embodiment, the parties 115, 120 and 125 may be, for example, a person seeking home buying and/or selling services from the home buying and/or selling services provider or a representative of person seeking home buying and/or selling services from the home buying and/or selling services provider.

Each of the provider 110 and the parties 115, 120 and 125 includes a respective network interface for communicating with the network 105 (e.g., outputting information to, and receiving information from, the network 105), such as by transferring information (e.g., instructions, data, signals) between such parties and the network 105. Accordingly, through the network 105, the provider 110 communicates with the parties 115, 120 and 125, and the parties 115, 120 and 125 communicate with the provider 110.

For clarity, FIG. 1a depicts only one provider 110. However, the system 100 may include a plurality of providers. Likewise, for clarity, FIG. 1a depicts only three parties 115, 120 and 125. However, the system 100 may include a plurality of parties. In the discussion below, the party 115 is a representative one of the parties 115, 120 and 125.

Each of the provider 110 and the parties 115, 120 and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other. Accordingly, the provider 110 and the parties 115, 120 and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 105).

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer-readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer-readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer-readable medium 130e and the processor 130a are structurally and functionally interrelated with one another as described below in further detail. Each IHS of the illustrative embodiment is structurally and functionally interrelated with a respective computer-readable medium, similar to the manner in which the processor 130a is structurally and functionally interrelated with the computer-readable medium 130e. In that regard, the computer-readable medium 130e is a representative one of such computer-readable media including, for example, but not limited to, a hard disk drive.

The computer-readable medium 130e stores (e.g., encodes, records, or embodies) functional descriptive material (e.g., including but not limited to software (also referred to as computer programs or applications) or data structures). Such functional descriptive material imparts functionality when encoded on the computer-readable medium 130e. Also, such functional descriptive material is structurally and functionally interrelated to the computer-readable medium 130e.

With such functional descriptive material, data structures define structural and functional interrelationships between such data structures and the computer-readable medium 130e (and other aspects of the system 100). Such interrelationships permit the data structures' functionality to be realized. Also, within such functional descriptive material, computer programs define structural and functional interrelationships between such computer programs and the computer-readable medium 130e (and other aspects of the system 100). Such interrelationships permit the computer programs' functionality to be realized.

For example, the processor 130a reads (e.g., accesses or copies) such functional descriptive material from the computer-readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer-readable medium) for causing the processor 130a to perform additional operations (as described elsewhere herein). Accordingly, such functional descriptive material exhibits a functional interrelationship with the way in which processor 130a executes its processes and performs its operations.

Further, the computer-readable medium 130e is an apparatus from which the computer application is accessible by the processor 130a, and the computer application is processable by the processor 130a for causing the processor 130a to perform such additional operations. In addition to reading such functional descriptive material from the computer-readable medium 130e, the processor 130a is capable of reading such functional descriptive material from (or through) the network 105 which is also a computer-readable medium (or apparatus). Moreover, the memory device of the IHS 130 is itself a computer-readable medium (or apparatus).

Referring now to FIGS. 1a, 1b and 1c, the provider 110 is illustrated in more detail. An update engine 110a which may be, for example, software stored on the computer-readable medium 130e in the IHS 130, is included in the provider 110 and is operably coupled to the network 105, described above with reference to FIG. 1a, to a process database 110b, and to a party database 110c. An identifier monitoring and report engine 110d which may be, for example, software stored on the computer-readable medium 130e of the IHS 130, is included in the provider 110 and is operably coupled to the network 105, described above with reference to FIG. 1a, to the process database 110b, and to a monitoring database 110e. A bid retrieval and posting engine 110f which may be, for example, software stored on the computer-readable medium 130e of the IHS 130, is included in the provider 110 and is operably coupled to the network 105, described above with reference to FIG. 1a, and to a bid database 110g. In an embodiment, the process database 110b, the party database 110c, the monitoring database 110e, and the bid database 110g are conventional databases known in the art. In an embodiment, the process database 110b, the party database 110c, the monitoring database 110e, and the bid database 110g may be a plurality of separate databases (as illustrated) or may be a single database. In an embodiment, the process database 110b, the party database 110c, the monitoring database 110e, and the bid database 110g may be located outside the provider 110 and still operably coupled to the provider 110 and the update engine 110a, the identifier monitoring and report engine 110d, and the bid retrieval and posting engine 110f through, for example, the network 105, described above with reference to FIG. 1a. In an embodiment, the provider 110 is a membership organization and the party database 110c includes a variety of previously collected information on members of the membership organization. In an embodiment, the process database 110b, the party database 110c, the monitoring database 110e, and/or the bid database 110g may be publicly available databases. In an embodiment, the process database 110b, the party database 110c, the monitoring database 110e, and the bid database 110g may be private databases which are available to be accessed only by the provider 110 and/or those the provider 110 has allowed access.

Referring now to FIGS. 1a, 1b, 1c and 1d, a method 150 to provide process status update information is illustrated. In the illustrated embodiment, the method 150 is described in detail relating to an insurance claim process. However, it should be understood that the process may be any process that includes a plurality of steps that occur to bring the process to completion such as, for example, a loan process, a medical services process, a home buying and/or selling process, and a variety of other processes. As such, several alternative embodiments will be described at each appropriate step of the method 150, but those alternative embodiments are meant to merely constitute an example of the many different processes in which the method 150 is applicable to provide information to a party. In the illustrated embodiment, the method 150 includes a insurance claim process begin step 200, an insurance claim process appraisal step 300, an insurance claim process adjustment step 400, and an insurance claim process close step 500, all of which will be described in more detail below. Furthermore, additional steps may be added to the method 150 such as, for example, during repair of a damaged automobile, pictures of the stages of repair may be available through the process status updater.

Referring now to FIGS. 1a, 1b, 1c, 1d and 2, the method 150 begins with the insurance claim process begin step 200. At step 202, the insurance claim provider 110 communicates with the party 115 to receive an insurance claim process report from the party 115 that initiates the beginning of an insurance claim process. The insurance claim report may include, for example, a car accident report, a home damage report, a loss and/or theft of personal property report, a death of an insured report, or a variety of other reports that would trigger an insurance claim. In an embodiment, the insurance claim provider 110 may communicate with the party 115, for example, by phone, through the network 105 via, for example, a website, by fax, or through a variety of other communications tools. In an alternative embodiment, the process may be a loan process, the provider may be a loan provider, and the process report may be, for example, a request for a home loan, a car loan, an unsecured loan, and/or a variety of other loans. In an alternative embodiment, the process may be a home buying and/or selling process, the provider may be a home buying and/or selling services provider, and the process report may be, for example, a request for home buying and or selling services. In an alternative embodiment, the process may be medical services process, the provider may be a medical services provider, and the process report may be, for example, a request for medical services, a diagnosis of a disease, an injury report, or a variety of other medical issues.

The method 150 then proceeds to step 204 where the insurance provider 110 creates an insurance claim process status updater that is associated with the insurance claim process. The insurance provider 110 collects information from the party 115 such as, for example, the name of the party 115, the address of the party 115, and the details of the insurance claim that the party 115 is making and stores that information in the party database 110c. In an embodiment, the provider 110 is a membership organization, the party 115 is a member of the membership organization, and the party database 110c includes information about the party 115 that has been previously collected and stored and is available for the provider to access during step 204 of the method 150. The insurance provider 110 also creates a insurance claim process entry in the process database 110b in order to store updates about the insurance claim process of the party 115, an insurance claim monitoring entry in the monitoring database 110e in order to allow monitoring of the insurance claim process of the party 115, and a insurance claim bid entry in the bid database 110g in order to store bids used in the insurance claim process of the party 115. In an embodiment, the insurance claim process status updater may be, for example, a website, an automated telephone system, an automated email system, an automated fax system, and/or an automated short messaging or text message system. In an alternative embodiment, the process may be loan process and the provider 110 may be a loan provider and may collect information from the party 115 such as, for example, the name of the party 115, the address of the party 115, and the details of the loan request that the party 115 is making, and the provider 110 may store that information in the party database 110c while also creating a process entry in the process database 110b in order to store updates about the loan process of the party 115. Furthermore, the party database 110c may include information that was previously collected from the party 115 such as, for example, salary information, debt information, credit history information, and a variety of other loan information. In an alternative embodiment, the process may be home buying and/or selling process and the provider 110 may be a home buying and/or selling services provider and may collect information from the party 115 such as, for example, the name of the party 115, the address of the party 115, and the details of the home buying and/or selling services that the party 115 is requesting, and the provider 110 may store that information in the party database 110c while also creating a process entry in the process database 110b in order to store updates about the home buying and/or selling process of the party 115. Furthermore, the party database 110c may include information previously collected from the party 115 such as, for example, debt information, real estate holdings, salary information, and a variety of other home buying and/or selling information. In an alternative embodiment, the process may be medical services process and the provider 110 may be a medical services provider and may collect information from the party 115 such as, for example, the name of the party 115, the address of the party 115, and the details of the medical services needed by the party 115, and the provider 110 may store that information in the party database 110c while also creating a process entry in the process database 110b in order to store updates about the medical process of the party 115. Furthermore, the party database 110c may include previously collected information on the party 115 such as, for example, medical history information, drug allergy information, doctor preference information, and a variety of other medical services information.

The method 150 then proceeds to step 206 where the insurance provider 110 contacts other parties such as, for example, the parties 120 and 125, that may have been disclosed by the party 115 in the insurance claim process report or may have come to the attention of the provider 110 through, for example, a police report or some other manner. In an embodiment, the parties 120 and 125 may be, for example, parties that had property damaged by the party 115, parties that damaged the property of the party 115, insurance providers of parties that had property damaged by the party 115, insurance providers of parties that damaged the property of the party 115, law firms of parties that had property damaged by the party 115, law firms of parties that damaged the property of the party 115, and/or a variety of other parties. In an embodiment, the party 115 may have interests that are adverse to the parties 120 and 125 such as, for example, the party 115 may have damaged the property of the party 120 and the party 125, the parties 120 and 125 may have damaged the property of the party 115, and/or a variety of other adverse interests that arise in insurance claims. In an embodiment, the party 115 may be making an insurance claim and the party 120 may have caused the insurance claim to be made. In an alternative embodiment, the process may be home buying and/or selling process and the provider may be a home buying and/or selling services provider and may contact parties 120 and 125 who may be, for example, selling a home and/or representing a seller to the buyer party 115 or buying a home and/or representing a buyer to the seller party 115.

The method 150 then proceeds to step 208 where the insurance provider 110 assigns the party 115 with a process status updater identifier. In an embodiment, the process status updater identifier includes a plurality of alphanumeric characters, sounds, images, and/or video that allow the party 115 to access information about the insurance claim process that is updated by the process status updater. In an embodiment, the process status updater identifier includes a user ID associated with the party 115. In an embodiment, the process status updater identifier includes a password along with the user ID. In an embodiment, a process status updater identifier is assigned to the parties 120, 125, and any other party that is involved in the insurance claim process and needs access to information updated with the insurance claim process updater. In an embodiment, the process status updater identifier is the same for all of the parties such as, for example, the parties 115, 120 and 125, involved in the insurance claim process. In an embodiment, the process status updater identifier is different for each of the parties such as, for example, the parties 115, 120 and 125, involved in the insurance claim process. In an alternative embodiment, the process is a home buying and/or selling process and different identifiers are supplied to the seller party and the buyer party to access different information related to the home buying and/or selling process. In an alternative embodiment, the process is a medical services process and different identifiers are supplied to a treated party and a physician party to access different information related to the medical services of the treated party.

The method 150 then proceeds to step 210 where the insurance provider 110 informs the party 115 how to access the process status updater. In an embodiment, access to the process status updater may be accomplished through a website, over a phone, by fax, by a short message service (SMS) such as a text message, by email, and/or by a variety of other manners now known or to be known, including wired and wireless communication technologies. In an embodiment, the insurance provider 110 may supply the party 115 with a website address, a phone number, and/or instructions to set up an automated email service, text message service, and/or fax service. In an embodiment, the insurance provider 110 may inform a plurality of parties such as, for example, the parties 115, 120, 125, and any other parties involved in the insurance claim process how to access the process status updater.

Referring now to FIGS. 1a, 1b, 1c, 1d and 3, the method 150 proceeds to the insurance claim process appraisal step 300. At step 302, an appraiser or a plurality of appraisers are identified. In an embodiment, the insurance provider 110 identifies a single appraiser who will provide an estimate of the cost of repair of damaged property. In an embodiment, the insurance provider 110 identifies a plurality of appraisers who will each provide an estimate of their cost of repair of damaged property. The insurance provider 110 then adds the identity of the appraiser or appraisers to the process database 110*b* in the insurance process claim entry of the party 115. The method then proceeds to step 304 where the process status updater is updated with the identified appraiser or appraisers. The update engine 110*a* is operable to periodically access the process database 110*b* such as, for example, on a set time schedule, when an update on the insurance claim process is sought, when an update is made by the update engine 110*a*, or with a variety of other update methods, and provide any information that has changed since the previous update to the process status updater such as, for example, with the identity of the appraiser or appraisers identified by the provider 110 in step 302 of the method 150.

The method 150 then proceeds to step 306 where the appraisal or a plurality of appraisals are scheduled. In an embodiment, the insurance provider sets a date for the appraiser or each of the plurality of appraisers identified in step 302 of the method 150 to inspect damaged property and provide an amount they would require to repair the damaged property. The insurance provider 110 then adds the scheduled date of the appraisal or appraisals to the process database 110*b* in the insurance process claim entry of the party 115. The method 150 then proceeds to step 308 where the process status updater is updated with the date of the appraisals. The update engine 110*a* is operable to periodically access the process database 110*b* such as, for example, on a set time schedule, when an update on the insurance claim process is sought, when an update is made by the update engine 110*a*, or with a variety of other update methods, and provide any information that has changed since the previous update to the process status updater such as, for example, with the dates of the appraisal or appraisals scheduled in step 306 of the method 150.

The method 150 then proceeds to step 310 where the appraisal or appraisals are conducted. The appraiser or appraisers identified in step 302 of the method 150 inspect the damaged property on the date set in step 306 of the method 150. Each of the appraisers then submit a 'bid', or an amount they would require to repair the damaged property, to the insurance provider 110. The insurance provider 110 then adds the appraisal bid or bids to the bid database 110*g* in the insurance process claim entry of the party 115. The method 150 then proceeds to step 312 where the process status updater is updated with the appraisal bids. The bid retrieval and posting engine 110*f* is operable to periodically access the bid database 110*g* such as, for example, on a set time schedule, when a new bid on the insurance claim process is received from an appraiser, when an update is made by the update engine 110*a*, or with a variety of other update methods, and provide any information that has changed since the previous update to the process status updater such as, for example, the company making a bid, the amount of the bid, and/or the date that the bid was received.

The method 150 then proceeds to step 314 where the appraiser is chosen. The appraiser bids received in step 310 of the method 150 are reviewed for details such as, for example, bid amount, materials proposed to repair the damaged property, appraiser reputation, and a variety of other appraisal related details, and an appraiser is selected to repair the damaged property. In an embodiment, the appraiser is selected by the provider 110. In an embodiment, the appraiser is selected by the party 115. The insurance provider 110 then adds the identity of the chosen appraiser and the appraisal amount to the process database 110*b* in the insurance process claim entry of the party 115. The method 150 then proceeds to step 316 where the process status updater is updated with the identity of the appraiser and the appraisal amount. The update engine 110*a* is operable to periodically access the process database 110*g* such as, for example, on a set time schedule, when an update on the insurance claim process is sought, when an update is made by the update engine 110*a*, or with a variety of other update methods, and provide any information that has changed since the previous update to the process status updater such as, for example, the appraisal amount and the chosen appraiser.

Referring now to FIGS. 1*a*, 1*b*, 1*c*, 1*d* and 4 the method 150 proceeds to the insurance claim process adjustment step 400. At step 402 the insurance provider 110 assigns an adjuster. In an embodiment, the adjuster reviews details of the damaged property and the appraisal chosen in step 314 of the method 150 and determines the amount that the insurance company will pay to the party 115 which may be, for example, the appraisal amount reduced by a monetary amount that is determined from the previous damage to the damaged property, the age of the damaged property, and a variety of other adjustment details. The insurance provider 110 then adds the identity of the assigned adjuster to the process database 110*b* in the insurance process claim entry of the party 115. The method 150 then proceeds to step 404 where the process status updater is updated to reflect that an adjuster has been assigned. The update engine 110*a* is operable to periodically access the process database 110*g* such as, for example, on a set time schedule, when an update on the insurance claim process is sought, when an update is made by the update engine 110*a*, or with a variety of other update methods, and provide any information that has changed since the previous update to the process status updater such as, for example, that an adjuster has been assigned to the process.

The method 150 then proceeds to step 406 where the adjuster determines a payout. After review of the appraisal amount chosen in step 314 of the method 150 and the adjustment details in step 402 of the method 150, the adjuster determines an amount that the insurance provider 110 will pay to, for example, the parties 115, 120 and 125 for the property that was damaged and brought about the insurance process claim. The insurance provider 110 then adds the payout information and an explanation for the payout amount to the process database 110*b* in the insurance process claim entry of the party 115. The method 150 then proceeds to step 408 where the process status updater is updated with the payout information and the explanation. The update engine 110*a* is operable to periodically access the process database 110*g* such as, for example, on a set time schedule, when an update on the insurance claim process is sought, when an update is made by the update engine 110*a*, or with a variety of other update methods, and provide any information that has changed since the previous update to the process status updater such as, for example, the payout information and the explanation.

Referring now to FIGS. 1*a*, 1*b*, 1*c*, 1*d* and 5 the method 150 proceeds to the insurance claim process close step 500. At step 502 the insurance provider 110 provides the payout to the party 115. In an embodiment, the insurance provider 110 provides a payout to the party 115 in the amount determined by the adjuster in step 406 of the method 150. The insurance provider 110 then adds the payout amount to the process database 110*b* in the insurance process claim entry of the party 115. The method 150 then proceeds to step 504 where the process status updater is updated to include the payout amount information. The update engine 110*a* is operable to periodically access the process database 110g such as, for example, on a set time schedule, when an update on the insurance claim process is sought, when an update is made by the update engine 110a, or with a variety of other update methods, and provide any information that has changed since the previous update to the process status updater such as, for example, the amount of the payout.

The method 150 then proceeds to step 506 where the insurance provider determines a shut-down date for the process status updater. Once the payout has been made from the insurance provider 110 to the party 115 in step 502 of the method 150, the insurance provider 110 determines a time period after which the process status updater will no longer be available for the party 115 to receive information. In an embodiment, the time period is two weeks. The method 150 then proceeds to decision block 508 where the updater engine 110a determines whether the shutdown date has been reached. If the shutdown date has not been reached, the update engine 110a continues to check until the shutdown date is reached. If the shutdown date is reached or shutdown of the process updater is determined necessary using other methods, the method proceeds to step 510 where the process status updater is shut down. The update engine 110a shuts down the process status updater and frees up resources to provide process status updaters for other insurance claim processes.

In the illustrated embodiment of the method 150 of FIGS. 1d, 2, 3, 4 and 5, the method 150 has been shown and described for an insurance claim process that required an appraisal, and adjustment, and a payout. Within an insurance claim process, these steps may change depending whether the claim is a car insurance claim, a home insurance claim, a personal property claim, or a life insurance claim. Furthermore, a variety of different processes requiring a plurality of steps before the process is completed are envisioned to fall within the scope of this disclosure. For example, in a home buying and/or selling process, the appraisal step and the adjustment step may be replaced by, for example, a home inspection step where the home to be purchased is inspected for defects, a home appraisal step where the value of the home is determined, a financing step where the buyer attempts to acquire financing, a survey step where the property is surveyed, a disclosure step where the seller provides disclosures about the home, and option period step where the buyer has an opportunity to cancel the home contract, and/or a variety of other home buying and/or selling steps. In another example, in a medical services process, the appraisal step and the adjustment step may be replaced by, for example, an appointment step where a doctor visit is scheduled, a testing step where tests run by the doctor are evaluated, a medications available step where medications prescribed by the doctor are indicated as available for pickup, and/or a variety of other medical services steps. In another example, in a work contract process, the appraisal step and the adjustment step may be replaced by, for example, a request for information step where parties bidding on the work contract provide information about themselves, a request for proposals step where bids on the work contract are received from parties, and/or a variety of other work contract steps.

Referring now to FIGS. 1a, 1b, 1c, 1d, 2, 3, 4, 5 and 6a, a method 600 to provide process status update information is illustrated. The method 600 may be used concurrently with the method 150, described above, in order to provide information from the provider 110 to the party 115. The method 600 begins at step 602 where a party such as, for example, the parties 115, 120 and/or 125 communicates with the provider 110 to access the process status updater. The party 115 may communicate with the provider 110 through the network 105 using, for example, a website, email, an instant messaging service, using a telephone, fax, and/or a variety of other communication tools. In an embodiment, the party 115 may contact the provider 110 to access the process status updater. In an embodiment, the provider 110 may contact the party 115 to provide information from the process status updater.

Figure 6B:
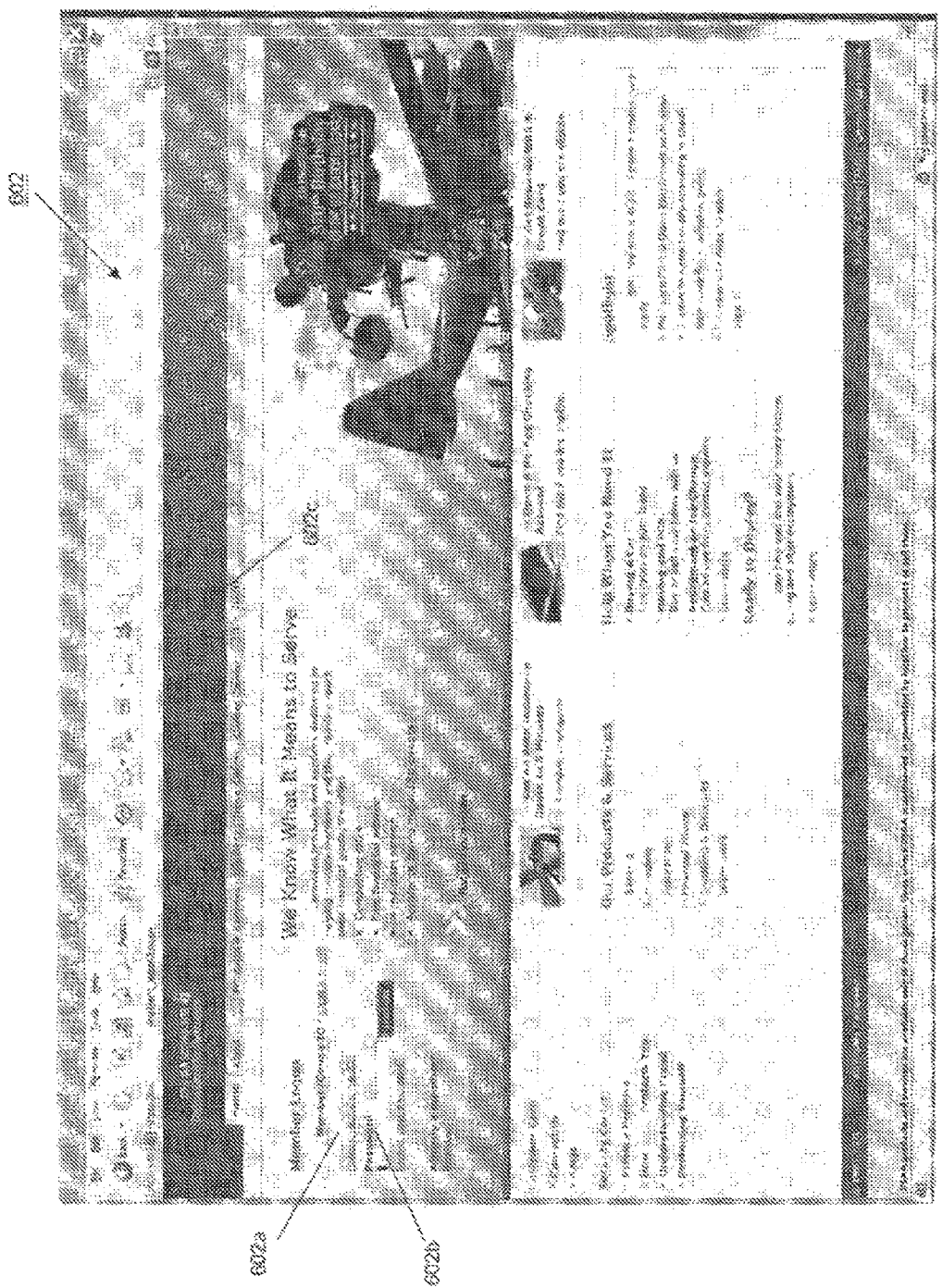

Referring now to FIGS. 6a and 6b, the method 600 then proceeds to decision block 604 where the provider 110 determines whether the party 115 is a customer of the provider 110. A webpage 602 may be provided to determine whether the party 115 is a customer of the provider 110. If the party 115 is a customer of the provider 110, the method 600 proceeds to step 606 where the party 115 may receive and/or provide access information to the provider 110 such as, for example, a user identification to enter in a user identification field 602a and a password to enter in a password field 602b. The party 115 may then choose a claim center tab 602c or use other methods in order to access the process status updater. If the party 115 is not a customer of the provider 110, the party may be directed by the provider 110 to the process status updater through, for example, a web address that provides the claim center tab 602c to access the process status updater.

Figure 6C:
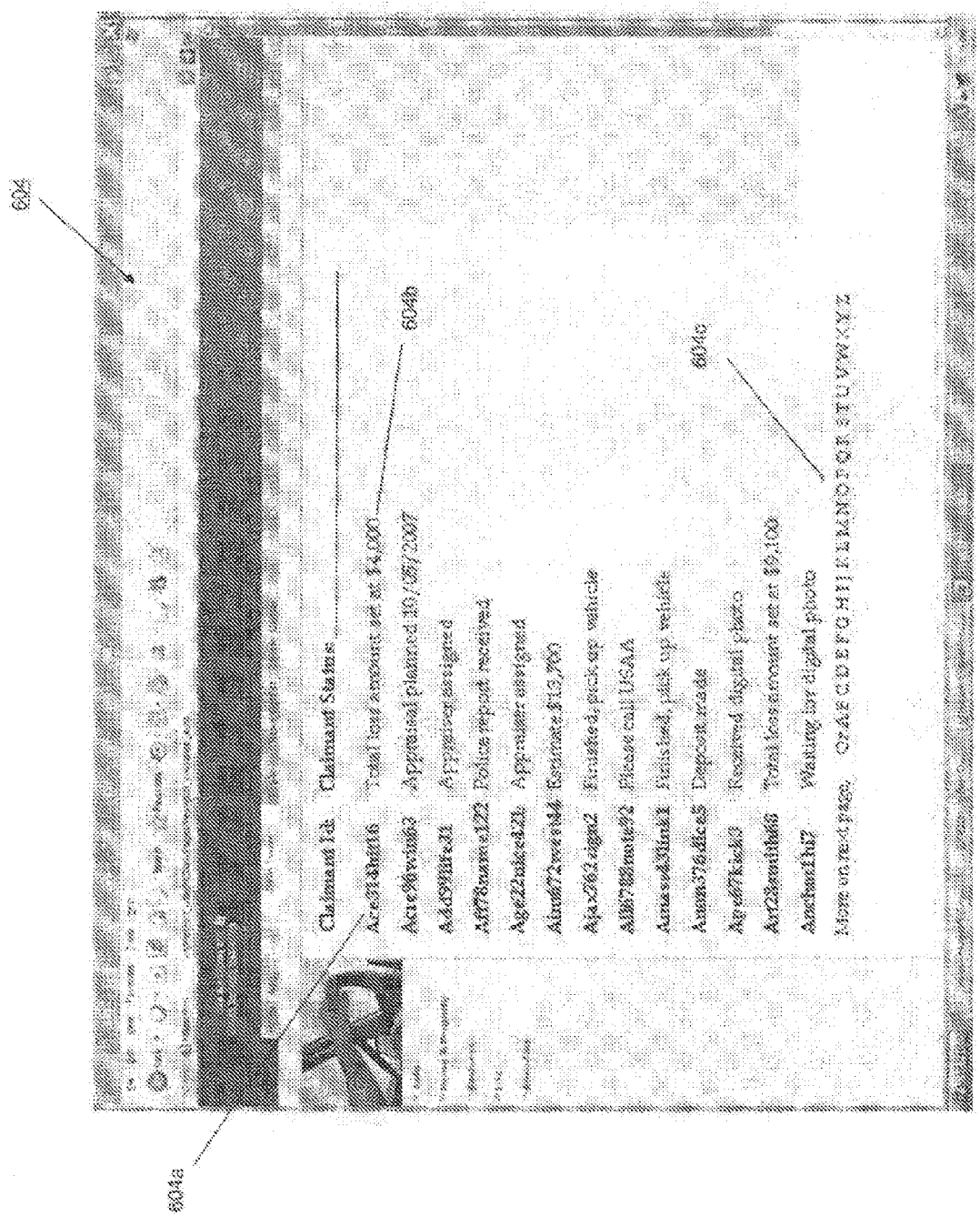

Referring now to FIGS. 6a and 6c, the method 600 proceeds to step 610 where the party 115 accesses the process status updater using the identifier supplied to the party 115 at step 208 of the method 150. In an embodiment, the identifier 604a may be an alphanumeric string such as, for example, "Ace314hit16". The party 115 may then access a process status updater website 604 that includes a plurality of identifiers and updates. The party 115 then finds the identifier 604a "Ace314hit16". An update 604b is located adjacent the identifier 604a and includes updated information such as, for example, "total loss amount set at $4,000", about the insurance claim process of the party 115. The website 604 further includes an alphabet index list 604c or other means to allow parties with identifiers to quickly access their identifier in the process status updater website in order to find the information on their process. Parties other than party 115 can use the process status updater website 604 to get updates on other processes by referencing their distinct identifier and finding the update adjacent their identifier, such as, for example, "Appraisal planned Oct. 5, 2007", "Appraiser assigned", "Police report received", "Estimate $13,700", "Finished, pick up vehicle", "Please call", "Deposit made", "Received digital photo", "Total loss amount set at $9,100", "Waiting for digital photo", and/or a variety of other updates that may be posted on the process status updater website 604 with the update engine 110a. In an embodiment, the information provided to the party 115 using a first identifier is different from the information provided to the party 120 using a second identifier. In an embodiment, the provider 110 may be a membership organization, the party 115 may be a member of the membership organization, the party 120 may not be a member of the membership organization, and the party 115 may be able to access information such as member benefits, specific details about an appraiser, or a range of appraisals for similarly appraised property from a given appraiser, that the party 120 is not able to access. In an alternative embodiment, the process status updater may include an automated phone system that the party 115 can call and provide the identifier to hear recorded updates about the insurance claim process of the party 115. In an alternative embodiment, the process status updater may include an automated phone system that contacts the party 115, prompts the party for the identifier, to provides recorded updates about the insurance claim process of the party 115.

Referring now to FIGS. 6a, 6d and 6e, in an alternative embodiment, the method 600 proceeds to step 610 where the party 115 accesses the process status updater using the identifier supplied to the party 115 at step 208 of the method 150. In an embodiment, a process status updater website 606 may be used and the identifier may be an user identification 606a such as, for example, "Ace314hit16", and a password 606b that the party 115 provides in order to access a process status updater website 608. In an embodiment, the identifier may be just the user identification 606a. The process status updater website 608 includes a plurality of dates 608a and a plurality of updates 608b each located adjacent a respective date such that the party may review the updates on their process that have occurred since the process began.

Figure 6F:
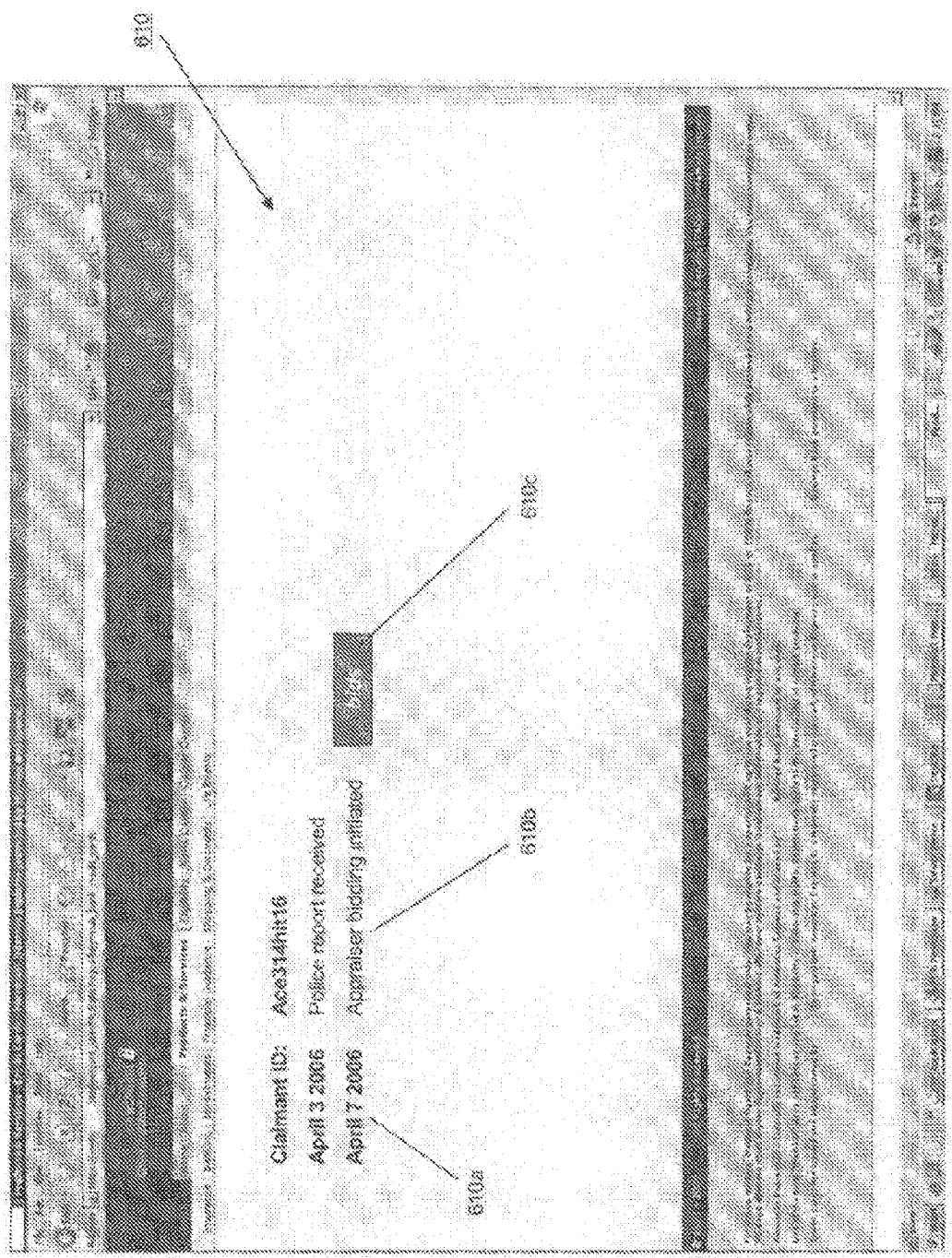
Figure 6G:
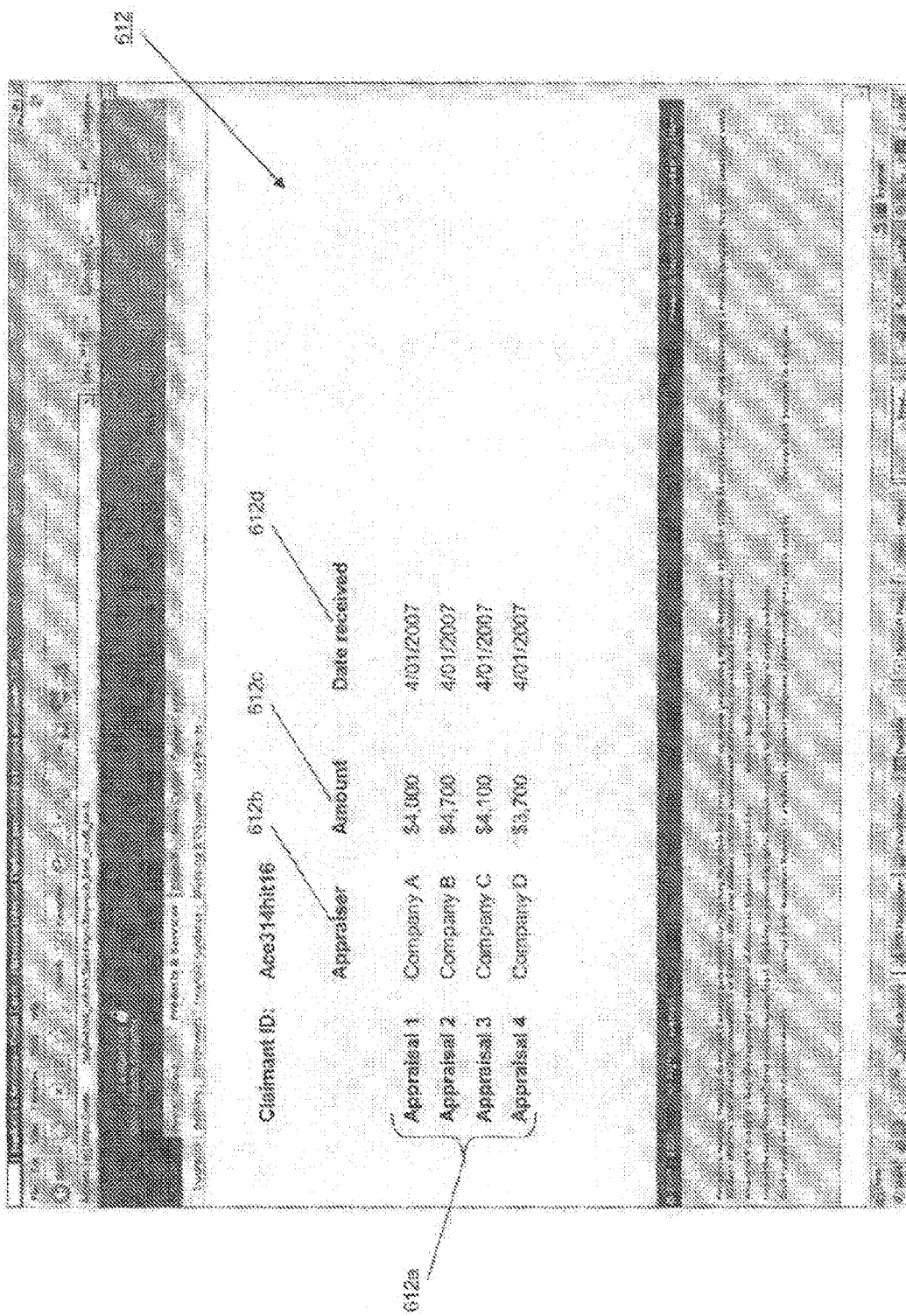

Referring now to FIGS. 6a, 6f and 6g, in an alternative embodiment, the method 600 proceeds to step 610 where the party 115 accesses the process status updater using the identifier supplied to the party 115 at step 208 of the method 150. In an embodiment, a process status updater website 610 may be used after the party 115 provides the user identification 606a such as, for example, "Ace314hit16", and the password 606b at process status updater website 608. A process status updater website 610 is then provided which includes a date 610a, an "Appraisal bidding initiated" update 610b located adjacent the date 610a, and a bids link 610c. If the party 115 accesses the bids link 610c, the party 115 is directed to a process status updater website 612 that includes a plurality of appraisal numbers 612a, an appraiser identification 612b located adjacent each appraisal number 612a, an appraisal amount 612c located adjacent each appraiser identification 612b, and a date received 612d located adjacent each appraisal amount 612c. The appraisal numbers 612a, appraiser identifications 612b, appraisal amounts 612c, and dates received 612d are collected by the bid retrieval and posting engine 110f from the bid database 110g and updated on the process status updater website 612. In an embodiment, the parties 115, 120 and 125 may be appraisers who are bidding to repair damage done to property, and each appraiser may have an identifier to access the process status updater website 612 such that each appraiser is able to review the appraisal amounts submitted by other appraisers. Thus, the process status updater website 612 creates a bidding situation where an appraiser may lower their appraisal amount to repair damaged property if another appraiser has underbid their previous bid. In an embodiment, after a predetermined time, bids are not accepted or posted to the process status updater website 612.

Referring now to FIG. 6a, the method 600 proceeds to step 612 where access information is recorded. The identifier monitoring and report engine 110d records all accesses of the process status updater using the identifier. In an embodiment, the identifier monitoring and report engine 110d records, identifies, captures, and/or executes a variety of other operations on, the Internet Protocol (IP) address of any computer accessing the process status updater websites. In an alternative embodiment, the identifier monitoring and report engine 110d records, identifies, captures, and/or executes a variety of other operations on, phone numbers accessing the process status updater when it is an automated phone system. In an alternative embodiment, the identifier monitoring and report engine 110d records, identifies, captures, and/or executes a variety of other operations on, email address accessing the process status updater when it is an automated email system. In an alternative embodiment, the identifier monitoring and report engine 110d records, identifies, captures, and/or executes a variety of other operations on, other data such as, for example, the name of the Internet Service Provider (ISP) for the information handling system that accessed the process status updater, the time and date of access, the browser version used to access the process status updater, and a variety of other identifying information. The method 600 then proceeds to step 614 where the access information is stored. Upon detecting access using the identifier, the identifier monitoring and report engine 110d stores that information in the insurance claim process entry for the party 115 in the monitoring database 110e. The method 600 then proceeds to step 616 where the access information is analyzed. The identifier monitoring and report engine 110d is operable to analyze the access information to determine, for example, whether a particular identifier has been used repeatedly in a given time period, whether a particular identifier has been used by more than one party or from more than one computer, phone number, and/or email address, and/or whether the use of a particular identifier has exceeded a threshold amount. Such information may be used to access and/or determine a number of events such as, for example, whether a lawsuit may be filed as a result of the events that initiated the process through recognition that an IP address associated with a law firm has used the identifier to access the process status updater website. In an embodiment, a plurality of known IP addresses are stored that correspond to law firms, insurance companies, law enforcement agencies, and/or a variety of other entities of interest. In an embodiment, such information may lead the provider to contact a party associated with the process in order to, for example, prevent a lawsuit from being filed or to provide a good customer experience. Thus, a system and method are provided that provide information to a party that is involved in a process without tying up resources of a provider and while allowing the provider to extract information about the process and the party based on the access to that information.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer-readable medium comprising computer-readable instructions to provide process status update information, said computer-readable instructions comprising instructions to:
   communicate with a party of a plurality of parties about an insurance claim process in which the party has an interest with others of the plurality of parties, the insurance claim process including a claim for damage to property;
   provide the party with an identifier, the identifier related to the party and the insurance claim process, and the identifier being the same for all of the plurality of parties;
   provide a process status updater operable to provide information about the insurance claim process to the party, wherein the information about the insurance claim process is provided when the party accesses the process status updater using the identifier, wherein the process status updater is one of: an automated telephone system, an automated email system, an automated fax system, or an automated instant messaging system;
   receive an estimate for repairing the damage to the property; and
   update the process status updater to communicate the estimate to the party, wherein the computer-readable instructions to receive an estimate comprise instructions to receive a plurality of estimates from a plurality of appraisers in a reverse auction format.

2. The computer-readable medium of claim 1, wherein the identifier comprises at least one of a user identification and a password.

3. The computer-readable medium of claim 1, further comprising computer-readable instructions comprising instructions to:
update the process status updater in response to the occurrence of at least one of a plurality of steps in the process.

4. The computer-readable medium of claim 1, wherein the process status updater is accessible by the party through a website.

5. The computer-readable medium of claim 1, wherein the process status updater is provided by a membership organization, and wherein the party is a member of the membership organization.

6. The computer-readable medium of claim 1, wherein the process status updater comprises an automated telephone system and wherein the instructions to provide the process status updater comprise instructions to:
receive a phone call from the party;
prompt the party for the identifier; and
provide an audible update about the process related to the identifier.

7. The computer-readable medium of claim 1, wherein the process status updater comprises an automated telephone system and wherein the instructions to provide the process status updater further comprise instructions to:
contact the party;
prompt the party for the identifier; and
provide an audible update about the process related to the identifier.

8. A computer-readable medium comprising computer-readable instructions to provide process status update information, said computer-readable instructions comprising instructions to:
communicate with a first party and a second party about an insurance claim process, wherein the first party comprises a first party interest in the process and the second party comprises a second party interest in the process, and wherein the first party interest is adverse to the second party interest, and wherein the insurance claim process including a claim for damage to property;
provide a process status updater for the process, the process status updater operable to indicate a step in the process;
provide an identifier to the first party and to the second party, the identifier related to the first party, the second party, and the process, and the identifier being the same for the first party and the second party for the process;
provide the first party and the second party with information about the process with the process status updater, wherein the first party and the second party access the information using the identifier, and wherein the process status updater is one of: an automated telephone system, an automated email system, an automated fix system, or an automated instant messaging system;
receive an estimate for repairing the damage to the property; and
update the process status updater to communicate the estimate to the first and second parties,
wherein the computer-readable instructions to receive an estimate comprise instructions to receive a plurality of estimates from a plurality of appraisers in a reverse auction format.

9. The computer-readable medium of claim 8, wherein the first party is making an insurance claim against the second party.

10. The computer-readable medium of claim 8, wherein the identifier for the first party is the same as the identifier for the second party.

11. The computer-readable medium of claim 8, wherein the identifier for the first party is different from the identifier for the second party.

12. The computer-readable medium of claim 8, wherein the process status updater is provided by a membership organization, whereby the first party is a member of the membership organization and the second party is not a member of the membership organization.

13. The computer-readable medium of claim 8, wherein the identifier provided to the first party provides access to information that is not accessible using the identifier provided to the second party.

14. The computer-readable medium of claim 8, wherein the process status updater comprises an automated telephone system and wherein the instructions to provide the first party and the second party with information about the process with the process status updater further comprise instructions to provide an audible update about the process related to the identifier.

15. A computer-readable medium comprising computer-readable instructions to provide process status update information, said computer-readable instructions comprising instructions to:
create a process status updater for an insurance claim process, the insurance claim process including a claim for damage to property;
associate an identifier with the process, the identifier operable to acquire information about the process from the process status updater, wherein the information about the insurance claim process comprises the step that the process is in;
provide a plurality of parties with the identifier, the identifier associated with the plurality of parties and the insurance claim process, and the identifier being the same for all of the plurality of parties;
update the process status updater;
record the use of the identifier by those of the plurality of parties using the identifier to acquire information related to the insurance claim process, wherein the process status updater is one of: an automated telephone system, an automated email system, an automated fax system, or an automated instant messaging system;
receive an estimate for repairing the damage to the property; and
update the process status updater to communicate the estimate to the plurality of parties,
wherein the computer-readable instructions to receive an estimate comprise instructions to receive a plurality of estimates from a plurality of appraisers in a reverse auction format.

16. The computer-readable medium of claim 15, wherein the recording comprises recording the number of uses of the identifier.

17. The computer-readable medium of claim 15, wherein the recording comprises recording the Internet Protocol (IP) address of an information handling system that is being used to access the process status updater.

18. The computer-readable medium of claim 15, further comprising computer-readable instructions comprising instructions to:
analyze the recorded uses of the identifier.

19. The computer-readable medium of claim 15, further comprising computer-readable instructions comprising instructions to:
   contact a party associated with the process.

20. The computer-readable medium of claim 15, further comprising computer-readable instructions comprising instructions to:
   provide the identifier to a first party and determine that a second party that is different from the first party is using the identifier to acquire information about the process from the process status updater.

21. The computer-readable medium of claim 15, wherein the process status updater comprises an automated telephone system and wherein the instructions further comprise instructions to:
   prompt a party of the plurality of parties for the identifier; and
   provide an audible update about the process associated with the identifier.

* * * * *

UNITED STATES PATENT AND TRADEMARK OFFICE
CERTIFICATE OF CORRECTION

| | | |
|---|---|---|
| PATENT NO. | : 8,160,904 B1 | Page 1 of 1 |
| APPLICATION NO. | : 11/733799 | |
| DATED | : April 17, 2012 | |
| INVENTOR(S) | : Arthur Q. Smith | |

It is certified that error appears in the above-identified patent and that said Letters Patent is hereby corrected as shown below:

In column 15, line 58, in Claim 8, delete "fix" and insert -- fax --, therefor.

Signed and Sealed this
Third Day of July, 2012

David J. Kappos
*Director of the United States Patent and Trademark Office*